(12) United States Patent
Shimazaki

(10) Patent No.: US 10,761,786 B2
(45) Date of Patent: Sep. 1, 2020

(54) COMMUNICATION APPARATUS, CONTROL METHOD, AND STORAGE MEDIUM

(71) Applicant: CANON KABUSHIKI KAISHA, Tokyo (JP)

(72) Inventor: Atsushi Shimazaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/248,039

(22) Filed: Jan. 15, 2019

(65) Prior Publication Data

US 2019/0235801 A1 Aug. 1, 2019

(30) Foreign Application Priority Data

Jan. 30, 2018 (JP) ................................ 2018-014190

(51) Int. Cl.
| | |
|---|---|
| *G06F 3/12* | (2006.01) |
| *H04W 8/00* | (2009.01) |
| *H04L 29/08* | (2006.01) |
| *H04W 4/20* | (2018.01) |
| *H04N 1/00* | (2006.01) |

(52) U.S. Cl.
CPC ........ *G06F 3/1211* (2013.01); *G06F 3/1236* (2013.01); *H04L 67/16* (2013.01); *H04N 1/00127* (2013.01); *H04W 4/20* (2013.01); *H04W 8/005* (2013.01)

(58) Field of Classification Search
None
See application file for complete search history.

(56) References Cited

U.S. PATENT DOCUMENTS

| | | | | |
|---|---|---|---|---|
| 2016/0027401 | A1* | 1/2016 | Umehara | G02B 27/017 345/633 |
| 2017/0086154 | A1* | 3/2017 | Sawada | H04W 48/16 |
| 2017/0093479 | A1* | 3/2017 | Mogi | H04W 48/16 |
| 2017/0094497 | A1 | 3/2017 | Aoki | |
| 2017/0311181 | A1* | 10/2017 | Furuichi | H04W 24/02 |

FOREIGN PATENT DOCUMENTS

JP 2017-63311 A 3/2017

* cited by examiner

*Primary Examiner* — Frantz Bataille
(74) *Attorney, Agent, or Firm* — Canon U.S.A., Inc. IP Division

(57) ABSTRACT

A communication apparatus is provided which includes a control unit configured to perform control so that an execution frequency of predetermined communication in a state in which a connection using a communication method other than a Neighbor Awareness Network is established is lower than an execution frequency of the predetermined communication in a state in which a connection using the communication method other than the Neighbor Awareness Network is not established.

20 Claims, 8 Drawing Sheets

EXAMPLE OF SCREEN FOR SETTING ENABLE/DISABLE OF NAN IN PRINTER

COMMUNICATION APPARATUS, CONTROL METHOD, AND STORAGE MEDIUM

BACKGROUND

Field of the Disclosure

The present disclosure relates to a communication apparatus, a control method, and a storage medium.

Description of the Related Art

Communication apparatuses in typical technique execute communication using a wireless local area network (LAN) compliant with the Institute of Electrical and Electronics Engineers (IEEE) 802.11 standard series. In recent years, a Neighbor Awareness Networking (NAN) Technical Specification has been specified by the Wireless Fidelity (Wi-Fi) Alliance®, and a further expansion is expected in usage scenes of wireless communication.

The specification is for a terminal device to find a communication apparatus existing near the terminal device without connecting to the communication apparatus. Japanese Patent Application Laid-Open No. 2017-63311 describes that a signal transmission and reception period (a discovery window (DW)) is set, and a signal for discovery is transmitted and received using the NAN during the DW.

With the widespread of apparatuses compliant with communication using the NAN, a frequency of communication in the NAN executed in the DW is required to be appropriately controlled.

The present disclosure is directed to appropriate control of a frequency of communication in the NAN executed in the DW.

SUMMARY

According to some embodiments, a communication apparatus which executes communication using a Neighbor Awareness Network and communication using a communication method other than the Neighbor Awareness Network includes a communication unit configured to execute communication of a predetermined signal with another communication apparatus in a discovery window, which is a period in which the predetermined signal based on the Neighbor Awareness Network is communicated and which comes at a predetermined time interval, and a control unit configured to control the communication unit so that an execution frequency of communication of the predetermined signal in a state in which a connection using the communication method other than the Neighbor Awareness Network is established is lower than an execution frequency of communication of the predetermined signal in a state in which the connection using the communication method other than the Neighbor Awareness Network is not established.

Further features of various embodiments will become apparent from the following description of exemplary embodiments with reference to the attached drawings.

DESCRIPTION OF THE EMBODIMENTS

Various exemplary embodiments will be described in detail below with reference to the attached drawings. However, if not specifically mentioned, the scope of the following claims is not limited only to relative arrangements of components and display screens described in the exemplary embodiments. Further, the components may be modified without departing from the scope of the exemplary embodiments.

A terminal device and a communication apparatus according to a first exemplary embodiment are described below. A smart phone is described as an example of a terminal device according to the present exemplary embodiment. A smart phone is a multifunctional mobile phone provided with a camera, a web browser, an electronic mail function, and other functions in addition to a function of a mobile phone. The terminal device is not limited to a smart phone and may be an apparatus which can communicate with a communication apparatus described below. For example, a digital camera, a mobile terminal, a personal computer (PC), a tablet terminal, a personal digital assistant (PDA), and a music reproduction device can be applied as a terminal device. A multifunction printer (MFP) which can provide a copy service, a facsimile (FAX) service, and a print service is described as an example of a communication apparatus according to the present exemplary embodiment. However, the communication apparatus is not limited to an MFP. Various apparatuses can be applied as a communication apparatus as long as the apparatus can communicate with a terminal device. For example, a printer such as an ink jet printer, a full-color laser beam printer, and a monochromatic printer are applicable. Further, an apparatus which can provide a service other than printing is also applicable, such as a copying machine, a facsimile apparatus, a smart phone, a mobile terminal, a PC, a tablet terminal, a PDA, a digital camera, a music reproduction device, a storage, a projector, and a smart speaker. A smart speaker is an apparatus which instructs a device existing on the same network to perform processing based on a voice uttered by a user and notifies a user of information obtained via the network in response to a voice uttered by the user. A single function printer (SFP) having a single function is also applicable.

<System Configuration>

First, a system configuration for realizing the present exemplary embodiment is described.

Figure 1:
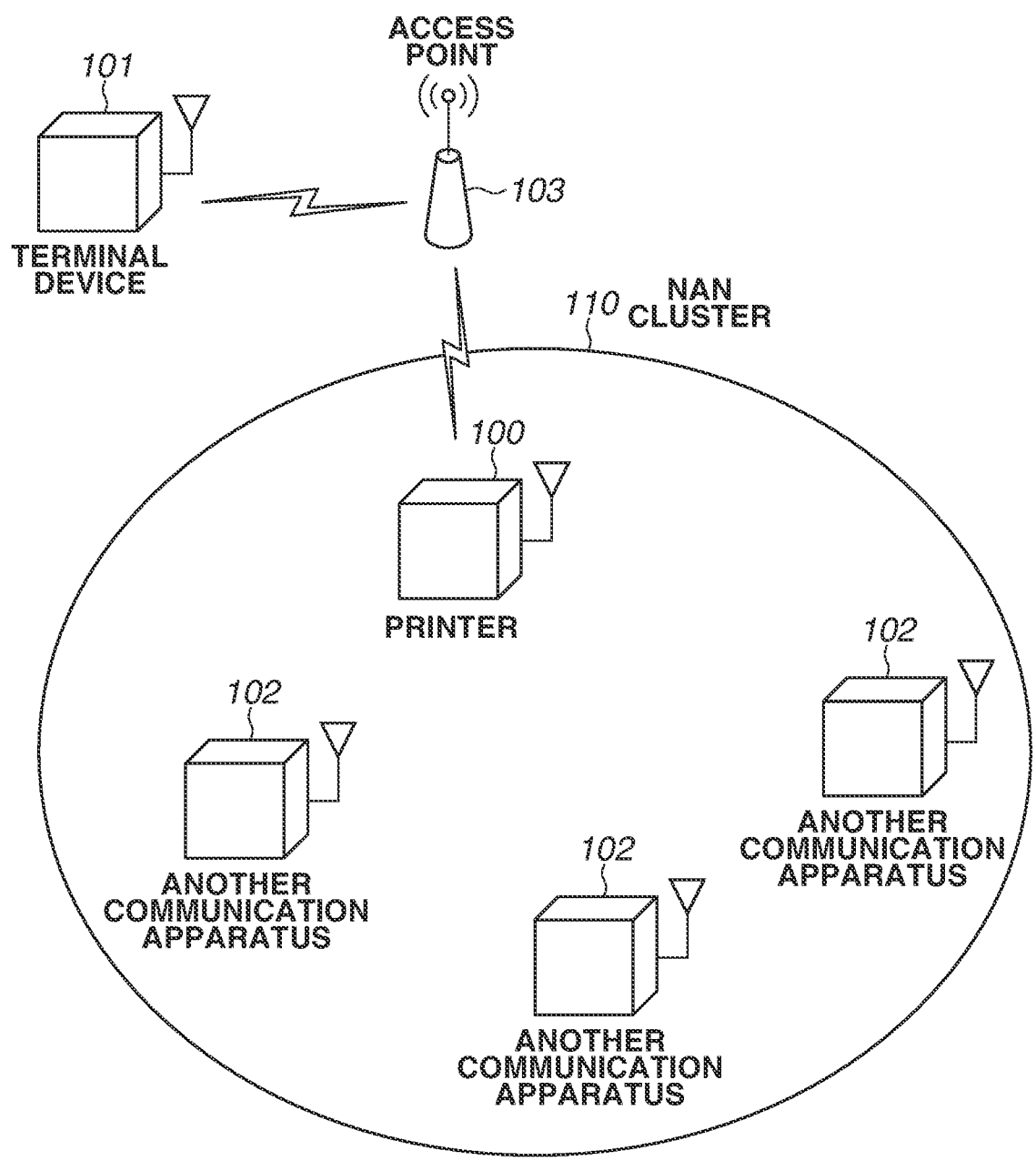
FIG. 1 illustrates an example of a configuration of a communication system.

FIG. 1 illustrates an example of a configuration of a communication system according to the present exemplary embodiment. The system includes a printer 100, a terminal device 101, an access point 103, and another communication apparatus 102, which is a communication apparatus other than the printer 100.

The terminal device 101 is a terminal device according to the present exemplary embodiment. The printer 100 is a communication apparatus according to the present exemplary embodiment. All of the printer 100, the terminal device 101, and the another communication apparatus 102 have a Wireless Local Area Network (WLAN) function compliant with the IEEE 802.11 standard series (Wi-Fi® function). According to the present exemplary embodiment, a Neighbor Awareness Network (NAN) and normal Wi-Fi® in which high-speed communication can be performed at power consumption higher than that of the NAN are included as the WLAN functions compliant with the IEEE 802.11 standard series.

Communication in the normal Wi-Fi® will be described. Each apparatus can communicate with each other by establishing a WLAN connection via the access point 103 outside of the apparatus using the normal Wi-Fi®. The printer 100 and the terminal device 101 themselves can operate as access points. Thus, for example, one of the apparatuses operates as an access point, and the other apparatus connects to the access point, and accordingly the terminal device 101 and the printer 100 can directly perform the WLAN connection not via the access point 103. As described above, the terminal device 101 and the printer 100 can perform peer-to-peer (P2P) communication. In a case where each apparatus operates as an access point, the apparatus operating as the access point forms a WLAN with a communication partner apparatus and periodically transmits a beacon signal. Further, in a case where each apparatus operates as an access point, the apparatus operating as the access point determines a channel used for wireless communication and performs authentication processing on connection information (a password, etc.) transmitted from a communication partner apparatus.

Communication using the NAN will be described. The printer 100 notifies a NAN compliant device near the printer 100 that the printer 100 itself provides a printing service using the NAN. Specifically, the printer 100 broadcasts a predetermined signal for notifying that the printer 100 itself provides the printing service to the apparatus around the printer 100 in a discovery window (DW) described below. A communication channel used for NAN communication in the DW is a channel 6 (6 ch) corresponding to a 2.4 GHz frequency band, or a channel 44 (44 ch) and a channel 149 (149 ch) corresponding to a 5 GHz frequency band. These communication channels are referred to as NAN-specified communication channels for convenience. A NAN data link described below may use the NAN-specified communication channel.

The printer 100 performs communication for realizing the printing service (transmission and reception of a print job, etc.) with the NAN compliant device, which detects the signal through WLAN communication. The communication for realizing the service is performed using the NAN data link, which is communication for transmitting and receiving data in a period other than the DW. The NAN data link can perform relatively fast and secure WLAN communication and is executed using a communication circuit same as that used for service notification using the NAN. In other words, the present exemplary embodiment can reduce a cost of a communication apparatus compared to, for example, a configuration in which communication for realizing the service and communication used for service notification are respectively performed using different communication circuits.

Figure 7:
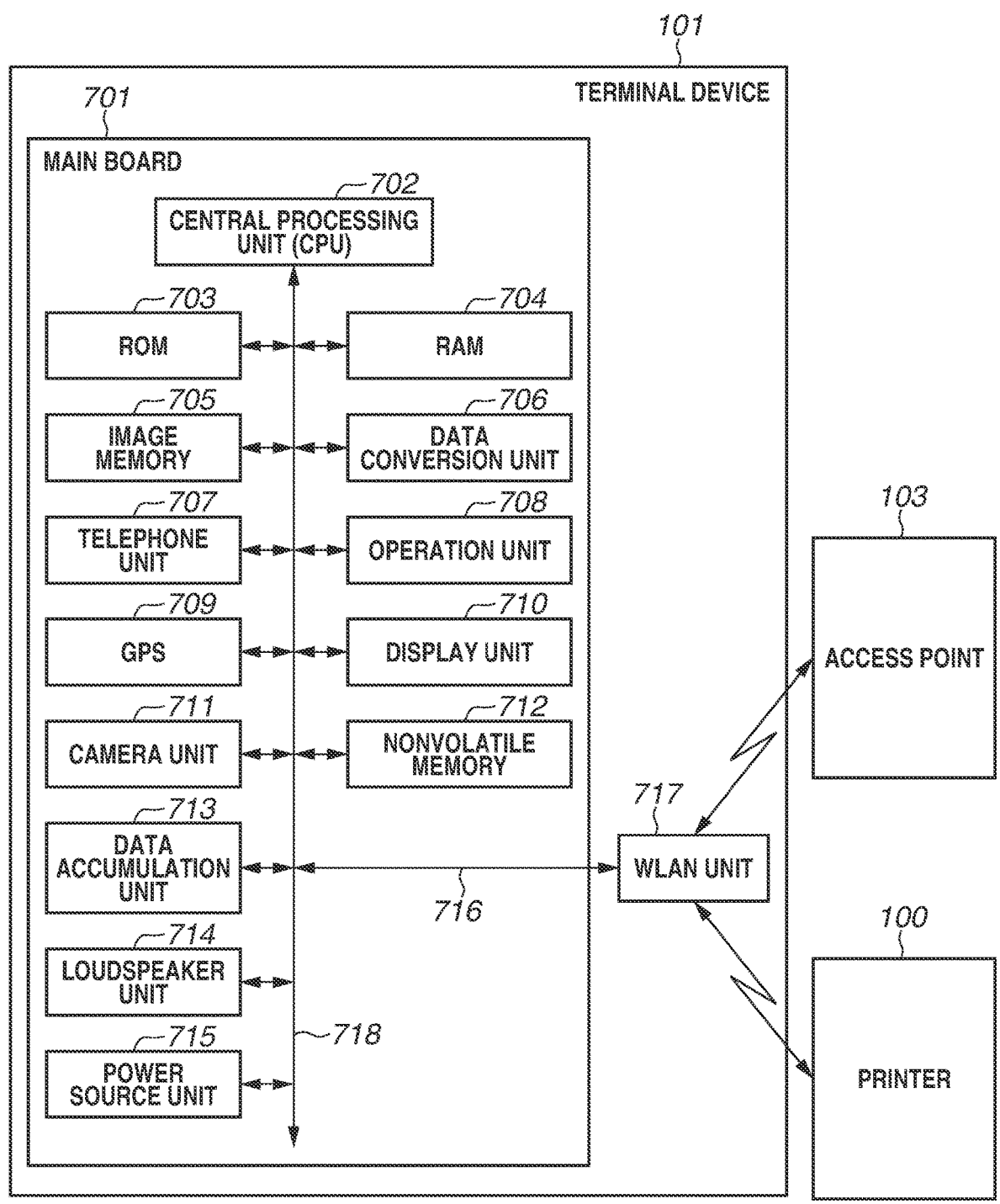
FIG. 7 is a block diagram illustrating a configuration of a terminal device.

FIG. 7 is a block diagram illustrating a configuration of the terminal device 101. The another communication apparatus 102 may include a configuration similar or identical to that of the terminal device 101.

The terminal device 101 includes a main board 701, which performs main control on the device itself, and a WLAN unit 717, which performs the WLAN communication.

In the main board 701, a central processing unit (CPU) 702 is a system control unit and entirely controls the terminal device 101 by executing a program stored in a read-only memory (ROM) 703 and starting up hardware. Processing described below executed by the terminal device 101 is executed based on control by the CPU 702.

The ROM 703 stores a control program and a built-in operating system (OS) program executed by the CPU 702, and others. According to the present exemplary embodiment, each control program stored in the ROM 703 performs software control, such as scheduling and task switching, under control of the built-in OS stored in the ROM 703.

A random access memory (RAM) 704 includes a static random access memory (SRAM) and a dynamic random access memory (DRAM). The RAM 704 stores data pieces, such as a program control variable, a setting value registered by a user, and management data of the terminal device 101. The RAM 704 includes buffer areas for various types of work.

An image memory 705 includes a DRAM and temporarily stores image data received via the WLAN unit 717 and image data read from a data accumulation unit 713, which are to be processed by the CPU 702.

A nonvolatile memory 712 includes a flash memory and stores data to be retained in a case where a power source is turned off.

A memory configuration included in the terminal device 101 is not limited to the above-described one and may be appropriately changed in the number, characteristics, and storage capacities of the memories according to an application and a purpose. For example, the image memory 705 and the RAM 704 may be shared, and the data accumulation unit 713 may be used for backing up data. According to the present exemplary embodiment, a DRAM is used as the image memory 705. However, another storage medium, such as a hard disk (HDD) and a nonvolatile memory, may be used.

A data conversion unit 706 performs analysis of data pieces in various formats and data conversion, such as color conversion and image conversion, on image data.

A telephone unit 707 controls a telephone line and realizes communication using a telephone by processing voice data input and output via a loudspeaker unit 714.

An operation unit 708 receives an operation by a user and detects that the user executes the operation.

A Global Positioning System (GPS) 709 obtains position information, such as a current latitude and longitude, of the terminal device 101.

A display unit 710 can display various input operation screens, an operation condition screen, and a status condition screen of the printer 100, and the like.

A camera unit 711 has a function of electronically recording and encoding an image input via a lens. Image data corresponding to the image captured by the camera unit 711 is stored in the data accumulation unit 713.

The loudspeaker unit 714 realizes a function of inputting and outputting a voice for a telephone function and other functions, such as alarm notification.

A power source unit 715 is a portable battery which controls power supply in the terminal device 101. A power source state of the terminal device 101 includes a battery exhaustion state in which the battery has no remaining capacity, a power-off state in which a power source key 204 is not pressed, a start-up state in which the device is normally started up, and a power-saving state in which the device is started up, but power consumption is lower than that in the start-up state.

The WLAN unit 717 performs wireless communication via the WLAN. According to the present exemplary embodiment, the WLAN unit 717 performs communication compliant with the IEEE 802.11 standard series. Specifically, the WLAN unit 717 can execute, for example, both communication using the normal Wi-Fi® and communication using the NAN (also referred to as Wi-Fi Aware®) in one unit. The WLAN unit 717 has functions of performing beacon detection processing and authentication processing for establishing the WLAN connection and transmitting a print job to a communication apparatus to which the WLAN connection is established. The terminal device 101 performs data communication with other devices, such as the printer 100, by the WLAN unit 717. The WLAN unit 717 is connected to the main board 701 via a bus cable 716.

The terminal device 101 may include a plurality of interfaces for communicating with external apparatuses. For example, the terminal device 101 may include interfaces for executing communication using Bluetooth® and communication using Near Field Communication (NFC) in addition to the communication compliant with the IEEE 802.11 standard series. Further, the terminal device 101 may include not only the interface for executing wireless communication, but also an interface for executing wired communication.

According to the present exemplary embodiment, the terminal device 101 transmits a job to the printer 100 with the WLAN unit 717. A job to be transmitted to the printer 100 includes a print job for causing the printer 100 to perform printing, a scan job for causing the printer 100 to read (scan) a document, and a setting job for changing and performing a setting of the printer 100. The print job includes, for example, image data selected by a user on the terminal device 101 and print setting information. The setting job is a job for changing and performing, for example, a connection setting for connecting the printer 100 to another apparatus and a setting of an operation mode in printing by the printer 100.

Each of components (703 to 715 and 717) in the main board 701 is connected with each other via a system bus 718 managed by the CPU 702.

Figure 8:
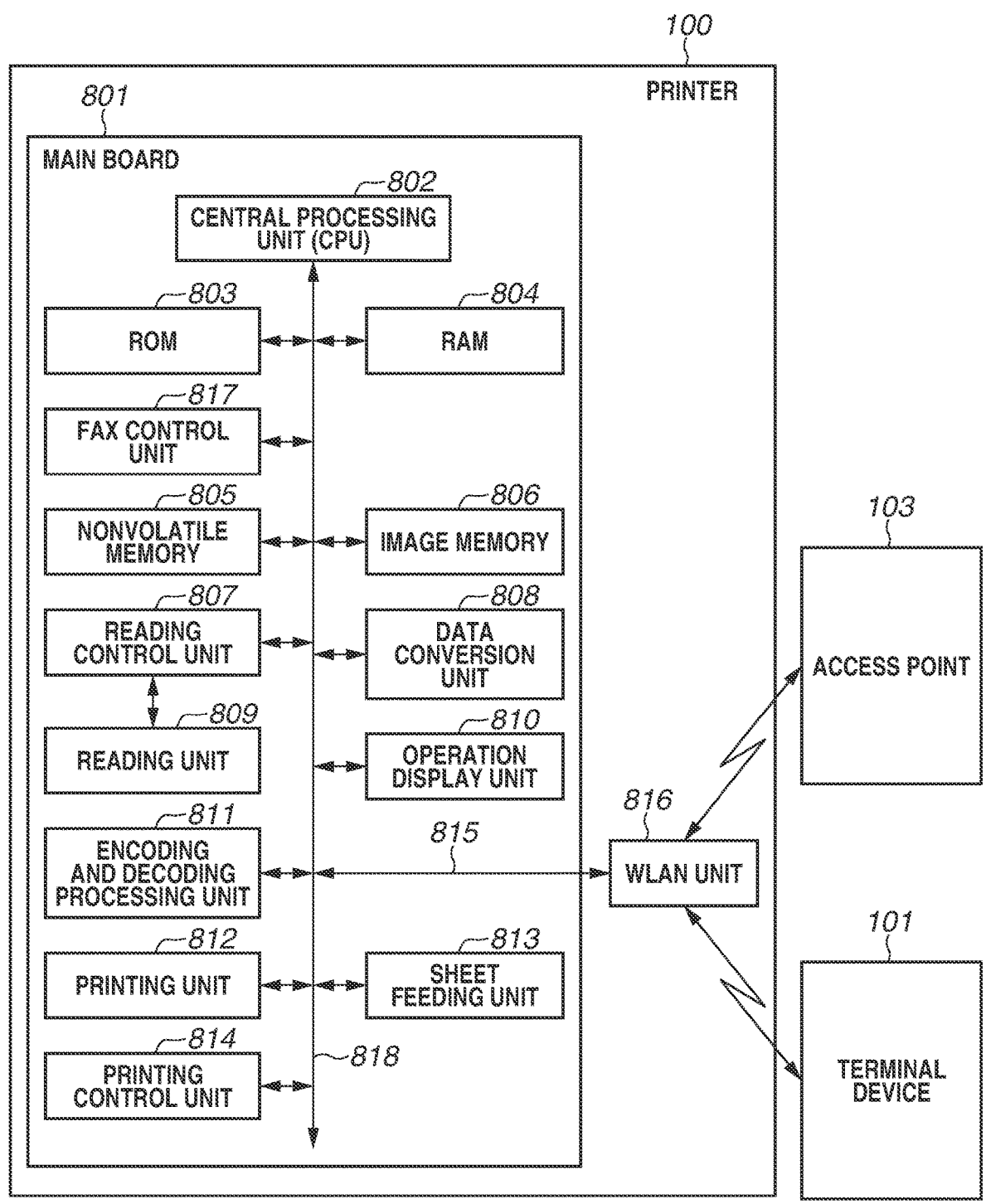
FIG. 8 is a block diagram illustrating a configuration of a printer.

FIG. 8 is a block diagram illustrating a configuration of the printer 100. The another communication apparatus 102 may include a configuration similar or identical to that of the printer 100.

The printer 100 includes a main board 801, which performs main control on the printer itself, and a WLAN unit 816, which performs the WLAN communication.

In the main board 801, a CPU 802 is a system control unit and entirely controls the printer 100 by executing a program stored in a ROM 803 and starting up hardware. Processing described below as executed by the printer 100 is executed based on control by the CPU 802.

The ROM 803 stores a control program and a built-in OS program executed by the CPU 802, and others. According to the present exemplary embodiment, each control program stored in the ROM 803 performs software control, such as scheduling and task switching, under control of the built-in OS stored in the ROM 803.

A RAM 804 includes an SRAM and a DRAM. The RAM 804 stores data pieces, such as a program control variable, a setting value registered by a user, and management data of the printer 100. The RAM 804 includes buffer areas for various types of work.

A nonvolatile memory 805 includes a flash memory and stores data to be retained in a case where a power source is turned off.

An image memory 806 includes a DRAM and accumulates image data received via the WLAN unit 816, image data processed by an encoding and decoding processing unit 811, and the like.

A memory configuration included in the printer 100 is not limited to the above-described one and may be appropriately changed in the number, characteristics, and storage capacities of the memories according to an application and a purpose, as with the memory configuration included in the terminal device 101.

A data conversion unit 808 performs analysis of data pieces in various formats, conversion from image data to print data, and the like.

A reading control unit 807 controls a reading unit 809 (e.g., a contact image sensor (CIS)) to optically read an image on a document. Further, the reading control unit 807 outputs an image signal which is obtained by converting the read image into electronic image data. In this regard, the reading control unit 807 may output the image signal after applying various types of image processing, such as binarization processing and half tone processing, thereto.

An operation display unit 810 receives, from a user, start-up of various functions and various settings as the MFP.

The encoding and decoding processing unit 811 performs encoding and decoding processing and scaling processing on image data (Joint Photographic Experts Group (JPEG), portable network graphics (PNG), and the like) handled by the printer 100.

A sheet feeding unit 813 stores a printing medium used for printing. A plurality of the sheet feeding units 813 may be prepared so as to store a plurality of types of printing media in one apparatus.

A printing control unit 814 can supply a printing medium to a printing unit 812 by controlling the sheet feeding unit 813. In a case where the plurality of the sheet feeding units 813 is prepared, the printing control unit 814 can control which sheet feeding unit is to be used for feeding a sheet in the plurality of the sheet feeding units 813.

The printing control unit 814 applies various types of image processing, such as smoothing processing, print density correction processing, and color correction, on the image data to be printed and then outputs the image data to the printing unit 812.

The printing unit 812 is an ink jet printer which prints an image by ejecting ink supplied from an ink tank from a print head. The printing unit 812 may not be an ink jet printer and may be, for example, a laser beam printer. The printing control unit 814 regularly reads information about the printing unit 812 and updates information in the RAM 804. Specifically, the printing control unit 814 updates status information, such as a remaining amount of the ink tank and a print head condition.

The WLAN unit 816 is similar to the WLAN unit 717, and thus the description thereof is omitted. The WLAN unit 816 is connected to the main board 801 via a bus cable 815. The terminal device 101 and the printer 100 can perform communication based on Wi-Fi Direct® by the WLAN units included in the respective apparatuses and have a software access point (software AP) function. The software AP function is a function of causing an apparatus which executes the relevant function to function as a software-based access point. In a case where the WLAN unit 816 performs communication in a Wi-Fi Direct® mode, communication in a software AP mode, and communication in an ad-hoc mode, the WLAN unit 816 directly communicates with a communication partner apparatus, such as the terminal device 101 (not via an external apparatus). Further, in a case where the WLAN unit 816 performs communication in an infrastructure mode, the WLAN unit 816 communicates with a communication partner apparatus via an external apparatus (e.g., the access point 103) installed on the network.

The printer 100 may include a plurality of interfaces for communicating with external apparatuses as with the terminal device 101.

Each of the components (802 to 814 and 816) in the main board 801 is connected with each other via a system bus 818 managed by the CPU 802.

<Peer to Peer (P2P) Mode>

In order to establish a connection in a Peer to Peer (P2P) method (hereinbelow, a P2P connection) in the WLAN communication, the printer 100 according to the present exemplary embodiment operates in a P2P mode (the software AP mode and the Wi-Fi Direct® mode). According to the present exemplary embodiment, the P2P connection is a form in which apparatuses establish a direct wireless connection therebetween, not via an external apparatus, such as the access point 103. During an operation in the P2P mode, the printer 100 operates as a master station (parent station) in the network to which the printer 100 belongs.

Wi-Fi Direct® is the specification formulated by the Wi-Fi Alliance®. The terminal device 101 and the printer 100, which are Wi-Fi Direct® compliant devices, can directly establish a wireless connection therebetween, not via another access point, using Wi-Fi Direct®. An apparatus which is a Wi-Fi Direct® compliant device and serves as an access point is particularly referred to as a Group Owner. In addition, a mode for executing the P2P connection in Wi-Fi Direct® is referred to as the Wi-Fi Direct® mode.

The printer 100 has the software AP function for operating as an access point. The printer 100 operates as the software AP, the terminal device 101 establishes the WLAN connection with the relevant software AP, and accordingly the terminal device 101 and the printer 100 can directly establish the wireless connection therebetween, not via another access point. A mode in which the printer 100 operates as the software AP so as to execute the P2P connection is referred to as the software AP mode.

In the P2P mode, the printer 100 operates as the access point, so that the printer 100 can determine which communication channel to use in communication in the P2P mode. For example, in a case where the printer 100 concurrently operates in the infrastructure mode and the P2P mode, the printer 100 uses a communication channel used for the communication in the infrastructure mode for the communication in the P2P mode. In addition, the printer 100 may preferentially select, for example, the NAN-specified communication channel as a channel used for the communication in the P2P mode than other channels.

<Infrastructure Mode>

In order to establish a connection in an infrastructure method (hereinbelow, an infrastructure connection) in the WLAN communication, the printer 100 according to the present exemplary embodiment operates in the infrastructure mode. According to the present exemplary embodiment, the infrastructure connection is a form in which apparatuses establish a wireless connection therebetween via an external apparatus, such as the access point 103 which controls the network. During an operation in the infrastructure mode, the printer 100 operates as a slave station (child station) in the network to which the printer 100 belongs.

The printer 100 and the terminal device 101 connect to each other via the access point 103 in the infrastructure mode, and communication via the access point 103 can be performed between the printer 100 and the terminal device 101. A channel used for the communication in the infrastructure mode may be the NAN-specified communication channel, and a connection using another channel may be used. Further, a frequency band other than 2.4 GHz (e.g., 5.0 GHz band) may be used.

According to the present exemplary embodiment, the communication in the P2P mode and the communication in the infrastructure mode are both executed not using the NAN, but using the normal Wi-Fi®. Further, according to the present exemplary embodiment, the printer 100 can concurrently execute operations in the P2P mode and in the infrastructure mode. In other words, the printer 100 can concurrently execute the operation as the master station in the network to which the printer 100 belongs and the operation as the slave station in the network to which the printer 100 belongs. To concurrently execute the operation in the P2P mode and the operation in the infrastructure mode is referred to as a simultaneous operation.

<Communication Using NAN>

Figure 2:
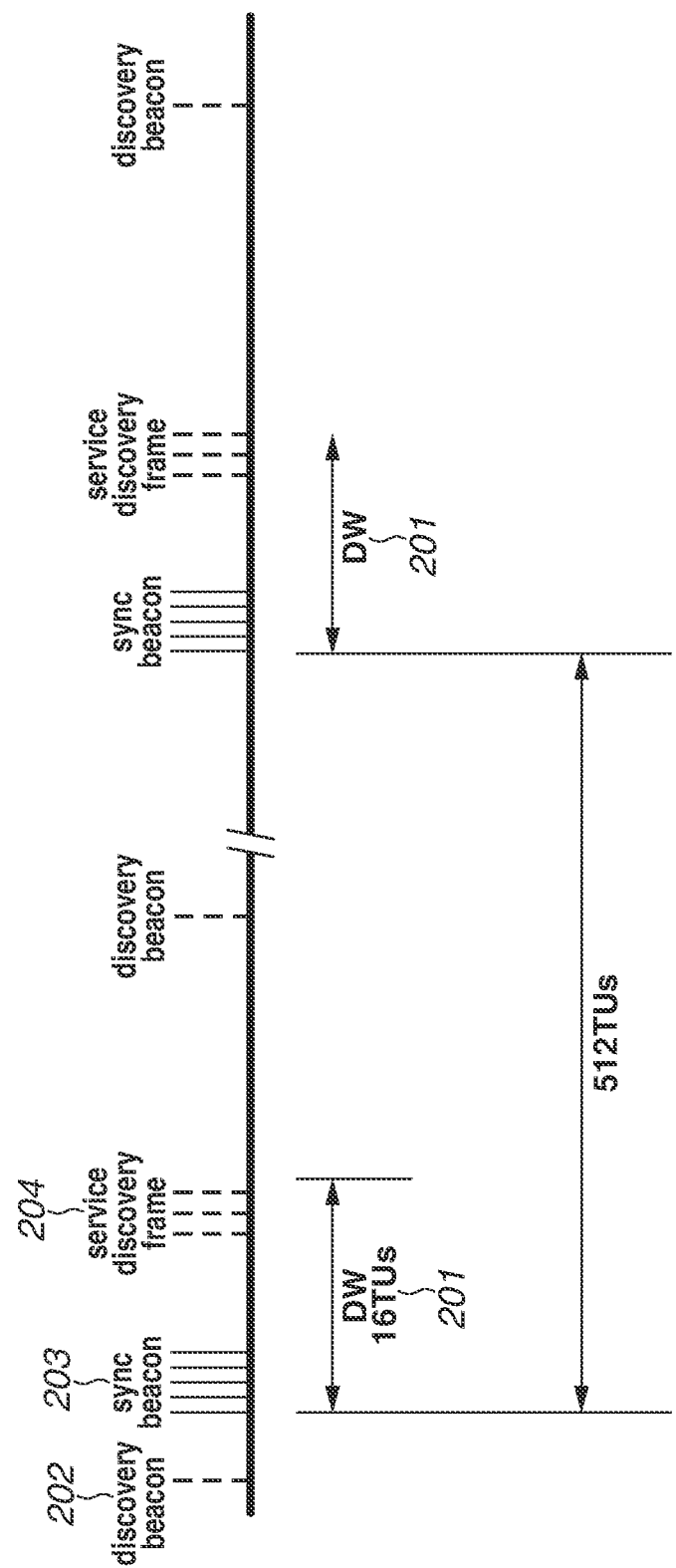
FIG. 2 illustrates communication using a Neighbor Awareness Network (NAN) executed by a printer.

The printer 100 can perform communication regarding finding a printing service between the another communication apparatus 102 using the NAN while maintaining the normal Wi-Fi® connection (the infrastructure connection and the P2P connection). FIG. 2 illustrates communication using the NAN executed by the printer 100 according to the present exemplary embodiment.

The communication using the NAN between the printer 100, which notifies of the service, and the another communication apparatus 102, which searches the service, is performed using 6 ch (2.437 GHz) in the 2.4 GHz frequency band.

A discovery window (DW) 201 is a period in which the printer 100 communicates with the another communication apparatus 102 belonging to a same NAN cluster 110. A group of communication apparatuses which share a schedule of the DW 201 is referred to as a NAN cluster. According to the present exemplary embodiment, the DW 201 is a period having 16 time units (TUs) and comes every 512 TUs. A TU is defined as 1024 microseconds.

The NAN cluster includes an apparatus operating as a Master having a role in repeatedly transmitting a discovery beacon 202 which is a signal for causing a terminal not belonging to the NAN cluster to recognize the NAN cluster. The discovery beacon 202 is transmitted, for example, every 100 ms at a timing other than the DW 201. The apparatus operating as the Master also transmits, in the DW 201, a synchronization beacon (hereinbelow, referred to as sync beacon) 203 which is a beacon for causing each terminal to identify and to synchronize with the DW 201. In the NAN, roles as a Non-Master Sync and a Non-Master Non-Sync are defined in addition to the Master. However, description thereof is omitted.

According to the present exemplary embodiment, the another communication apparatus 102 operates as a Master in the NAN cluster 110. The printer 100 recognizes the NAN cluster 110 by receiving the discovery beacon 202 from the another communication apparatus 102 and further detects the DW 201 of the NAN cluster 110 by receiving the sync beacon 203. The apparatus operating as the Master in the NAN cluster is allowed to be changed, so that the printer 100 can operate as the Master later. Further, the NAN cluster 110 may be formed in such a manner that the printer 100 transmits a discovery beacon as the Master, and the another communication apparatus 102 existing nearby receives the discovery beacon. Furthermore, a predetermined apparatus which is neither the printer 100 nor the another communication apparatus 102 may operate as the Master. Subsequently, the printer 100 and the another communication apparatus 102 may receive a discovery beacon transmitted from the predetermined apparatus and join the NAN cluster 110.

The printer 100 transmits information regarding whether to be able to provide a printing service to the another communication apparatus 102 in the DW 201 of which a setting timing is scheduled in the NAN cluster 110 to which the printer 100 belongs. First, the printer 100 transmits a publish message which is a signal for notifying of a service provided by the printer 100 itself in the DW 201 and thus notifies the another communication apparatus 102 of presence of the printer providing the service. On the other hand, the another communication apparatus 102 transmits a subscribe message which is a signal for searching or requesting a service provided by an apparatus other than itself in the DW 201 and thus notifies the printer 100 that the another communication apparatus 102 is searching a printer. In other words, the printer 100 receives the subscribe message in the DW 201. Hereinbelow, communication (transmission and reception of the publish message and the subscribe message) executed in the DW 201 is referred to as DW communication. Signals such as the publish message and the subscribe message are transmitted in a frame format referred to as a service discovery frame (SDF) 204.

The printer 100 does not have to execute the DW communication in every DW 201 which comes at a predetermined time interval. The printer 100 can arbitrarily select the DW 201 in which a DW communication operation, such as the service notification and reception of the subscribe message, is performed. In other words, the printer 100 can perform the DW communication operation in every DW 201 which comes every 512 TUs and can omit the DW communication operation in any DW 201. In other words, the printer 100 can arbitrarily adjust a time interval to perform the DW communication operation in the DW 201 (a frequency to execute the DW communication in the DW 201).

Specifically, the printer 100 may perform the DW communication operation only once in four successive DWs 201. In addition, a DW communication frequency may be set to zero (the DW communication is not executed in all of the DWs 201). In a case where it is absolutely necessary to execute the DW communication in a special DW referred to as a DW0 which comes once in 16 times of DW, a minimum frequency of the DW communication is once in 16 times.

The printer 100 is not necessarily required to continue communication using the NAN-specified communication channel in a period in which the printer 100 does not execute the DW communication. In other words, the printer 100 may execute communication over the NAN using a communication channel other than the NAN-specified communication channel in the period in which the printer 100 does not execute the DW communication. Further, the printer 100 may execute the communication in the P2P mode and the communication in the infrastructure mode over the normal Wi-Fi® using the communication channel other than the NAN-specified communication channel in the period in which the printer 100 does not execute the DW communication.

The printer 100 may execute the communication over the NAN continuously using the NAN-specified communication channel in the period in which the printer 100 does not execute the DW communication. Further, the printer 100 may execute the communication in the P2P mode and the communication in the infrastructure mode over the normal Wi-Fi® continuously using the NAN-specified communication channel in the period in which the printer 100 does not execute the DW communication.

The another communication apparatus 102 can recognize the service provided by the printer 100 by receiving a publish message and a follow-up message indicating that the printing service is being provided from the printer 100 in the DW 201. In a case where the above-described message is received from the printer 100 in the DW 201, the another communication apparatus 102 transmits a request for establishing the NAN data link to the printer 100. Accordingly, the another communication apparatus 102 establishes the NAN data link between the printer 100 and transmits a print job to the printer 100 using the NAN data link.

The another communication apparatus 102 may exchange information necessary for establishing a different wireless connection from the NAN (e.g., a normal Wi-Fi® connection and a Bluetooth® connection) with the printer using the NAN data link without transmitting a print job. Then, the another communication apparatus 102 may newly establish the different wireless connection based on the information received using the NAN data link and transmit a print job to the printer 100 using the different wireless connection.

<Setting Operation of Printer 100>

Figure 3:
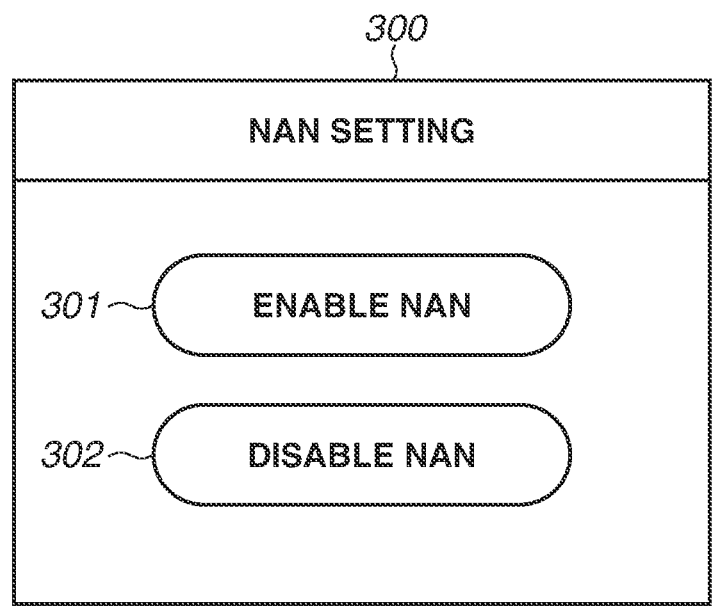
FIG. 3 illustrates an example of a user interface (UI) screen displayed on an operation display unit of a printer.

A user can perform a setting of whether to enable a NAN function using a user interface (UI) screen 300 (FIG. 3) which is displayed on the operation display unit 810. The NAN function is enabled in response to pressing of a NAN enabling button 301. In a case where the WLAN function is enabled in a state in which the NAN function is enabled, the printer 100 starts communication using the NAN (e.g., the DW communication and the communication using the NAN data link) using the WLAN unit 816. The NAN function may be enabled in response to the power-on of the printer 100 and reception of a setting command. In addition, in a case where the NAN function is enabled after the WLAN function is enabled, the printer 100 may start the communication over the NAN using the WLAN unit 816. The NAN function is disabled in response to pressing of a NAN disabling button 302. If the WLAN function is enabled in a state in which the NAN function is disabled, the printer 100 does not start the communication over the NAN using the WLAN unit 816, but starts only the communication by the normal Wi-Fi®. In a case where the WLAN function is enabled, communication using the NAN is started, and then the NAN function is disabled, the printer 100 may stop the communication over the NAN using the WLAN unit 816. The enabled/disabled state of the NAN function is stored in the RAM 804 and the like as a setting state of the printer 100.

The printer 100 can set whether to enable the NAN function in the state in which the WLAN function is enabled. However, the printer 100 is not limited to this configuration. For example, the printer 100 may execute both the communication using the NAN and the communication using the normal Wi-Fi® without fail in a case where the WLAN function is enabled. Further, for example, the printer 100 may separately execute a setting of whether to start the communication using the NAN and a setting of whether to start the communication using the normal Wi-Fi®.

The printer 100 can operate in the software AP mode, the Wi-Fi Direct® mode, and the infrastructure mode as described above. A user can also set whether to enable the respective operation modes via a screen (not illustrated)

displayed on the operation display unit 810. Enabled/disabled states of the respective operation modes are similarly stored in the RAM 804 and the like as the setting states of the printer 100. In a case where the software AP mode and the Wi-Fi Direct® mode are enabled, the printer 100 starts an operation as the access point and waits for a connection request from another apparatus. On the other hand, in a case where the infrastructure mode is enabled, the printer 100 starts a search for the another apparatus operating as the access point and connects to any of the found apparatuses (e.g., an apparatus selected by a user).

The issue of the present embodiment is described in detail.

According to the present exemplary embodiment, the printer 100 can execute not only the communication by the NAN but also the communication by the normal Wi-Fi® with the WLAN unit 816. However, the printer 100 executes both the communication using the NAN and the communication using the normal Wi-Fi® with the single WLAN unit, and thus, cannot execute both communications at the same time.

In other words, during execution of the communication using the NAN, a packet loss and a delay in a transmission packet may occur in the communication using the normal Wi-Fi®. The packet loss represents that a packet transmitted from the terminal device 101 using the normal Wi-Fi® is lost without being received by the printer 100 because the printer 100 is executing the communication using the NAN. The delay in a transmission packet represents that transmission of a packet is delayed until the normal Wi-Fi® becomes available in a case where packet transmission cannot be executed using the normal Wi-Fi® because the printer 100 is executing the communication using the NAN.

In a case where the communication using the normal Wi-Fi® is network communication via a Transmission Control Protocol (TCP) layer, the lost packet is retransmitted if the packet loss occurs. However, the lost packet is not retransmitted in the case of network communication via a User Datagram Protocol (UDP) layer. Therefore, depending on a behavior of the OS, a driver, or an application of the terminal device 101, there is a possibility that a communication partner apparatus cannot be detected in the communication using the normal Wi-Fi®, and the application cannot be used because of occurrence of the packet loss.

The above-described issue hardly occurs in a state in which a connection using the normal Wi-Fi® is not established. This is because if the printer 100 does not execute the communication using the normal Wi-Fi®, a packet loss and a delay in a transmission packet do not occur when the communication using the NAN is executed.

Reduction in throughput of reception of a print job and transmission of scan data based on a scan job due to a packet loss, and a delay in a transmission packet, are particularly an issue for the printer 100.

While the communication using the NAN is necessary for notifying an external NAN compliant device of a service, it is desirable that the number of execution times is suppressed as much as possible during the normal Wi-Fi® connection so as to reduce an influence on the communication using the normal Wi-Fi®. The communication using the NAN includes, specifically, DW communication.

Thus, according to the present exemplary embodiment, a configuration is described in which an execution frequency of the DW communication is reduced during the normal Wi-Fi® connection.

<Setting Processing of Execution Frequency of DW Communication>

Figure 4:
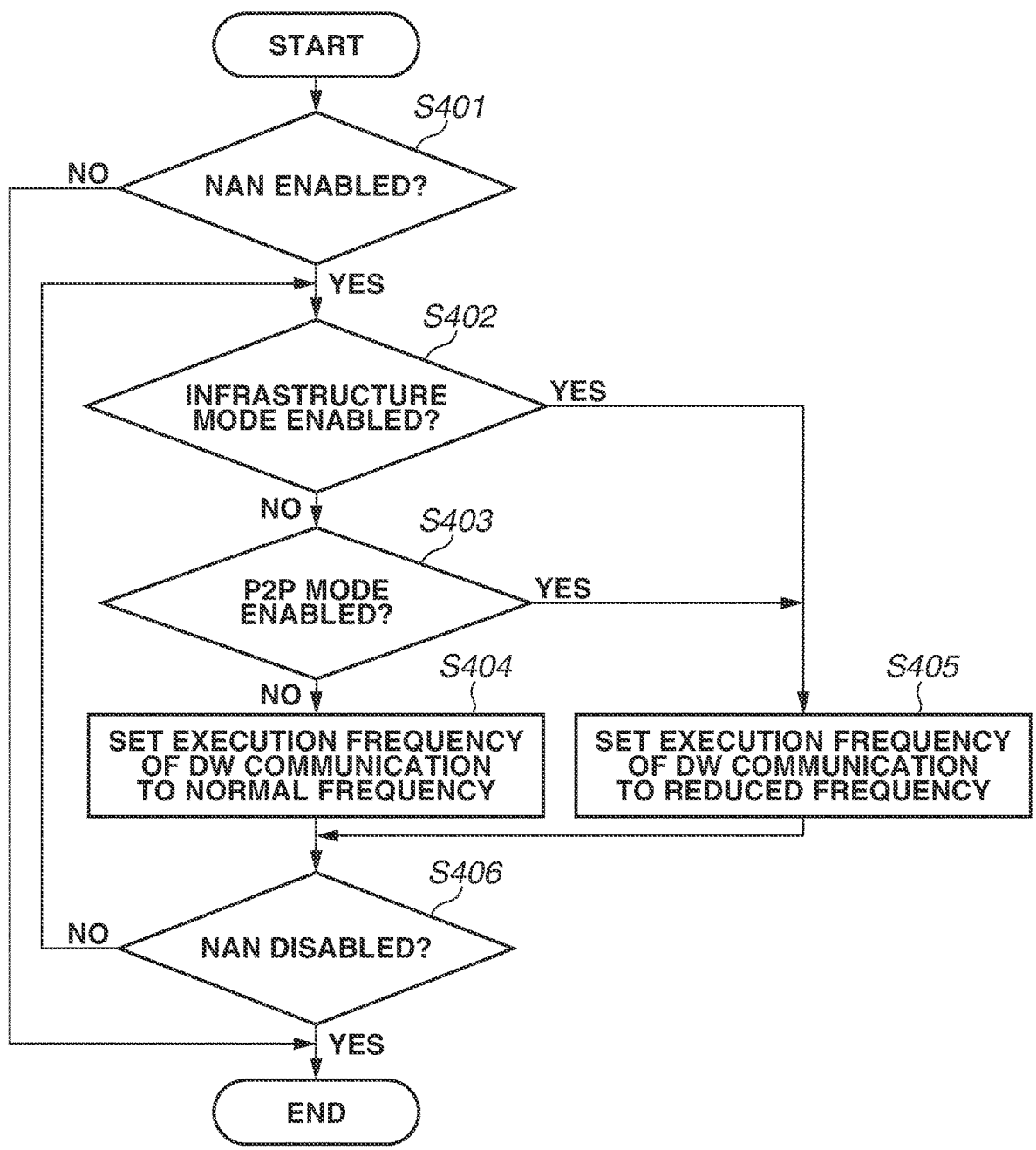
FIG. 4 is a flowchart illustrating setting processing of an execution frequency of discovery window (DW) communication executed by a printer according to a first exemplary embodiment.

FIG. 4 is a flowchart illustrating setting processing of the execution frequency of the DW communication executed by the printer 100. The processing in the present flowchart is realized, for example, by the CPU 802 reading a program stored in the memory, such as the ROM 803 to the RAM 804, and executing the program. Further, the processing in the present flowchart is started in response to, for example, enabling of the WLAN function in the printer 100.

In step S401, the CPU 802 reads setting information about the NAN stored in the RAM 804 and the like and determines whether the NAN function is enabled. In a case where the NAN is in a disabled state (NO in step S401), the CPU 802 does not start the communication using the NAN and terminates the setting processing of the execution frequency of the DW communication in the communication using the NAN. Regardless of whether the NAN function is enabled or disabled, the CPU 802 performs start-up processing of a conventional normal WLAN function, which is not illustrated, in response to enabling of the WLAN function. Start-up processing of the WLAN function includes, specifically, searching of an external access point and operating itself as the software AP using the normal Wi-Fi®.

In step S402, the CPU 802 reads setting information about the infrastructure mode stored in the RAM 804 and the like and determines whether the infrastructure mode is enabled (whether the infrastructure connection is established using the normal Wi-Fi®). This determination may be executed by determining, for example, whether the printer 100 operates as the slave station (a station) using the normal Wi-Fi®. In step S402, the CPU 802 advances the processing to step S405 in the case of YES in the determination and advances the processing to step S403 in the case of NO in the determination.

Next, in step S403, the CPU 802 reads setting information about the P2P mode stored in the RAM 804 and the like and determines whether the P2P mode is enabled (in other words, the connection in the P2P method is established using the normal Wi-Fi®). The present determination may be executed by determining, for example, whether the printer 100 operates as the master station (the access point and the Group Owner) using the normal Wi-Fi®. In step S403, the CPU 802 advances the processing to step S405 in the case of YES in the determination and advances the processing to step S404 in the case of NO in the determination. In a case where the printer 100 corresponds to both of the software AP mode and the Wi-Fi Direct® mode as the P2P mode, the CPU 802 may respectively perform determination on these two modes.

In the case of NO in determination in both of steps S402 and S403, in step S404, the CPU 802 instructs the WLAN unit 816 to perform a NAN operation with the execution frequency of the DW communication at a normal frequency. When an instruction of the NAN operation is issued, the WLAN unit 816 starts the communication using the NAN. In a case where the execution frequency of the DW communication is the normal frequency, the WLAN unit 816 executes, for example, the DW communication in every DW coming every 512 TUs. The WLAN unit 816 may omit the DW communication operation in any of the DWs 201 even if the execution frequency of the DW communication is the normal frequency without being limited to the above-described configuration. In other words, in a case where the execution frequency of the DW communication is the normal frequency, the execution frequency of the DW communication has only to be at least higher than that in a case where the execution frequency of the DW communication is a reduced frequency described below. In other words, in a case where the execution frequency of the DW communication is the normal frequency, the number of execution times of the DW communication in a unit time (e.g., one second) only has to be at least higher than that in a case where the execution frequency of the DW communication is the reduced frequency described below. In a case where the instruction of the NAN operation has been issued with the execution frequency of the DW communication at the normal frequency, the present processing may be omitted.

In the case of YES in determination in both of steps S402 and S403, in step S405, the CPU 802 instructs the WLAN unit 816 to perform the NAN operation with the execution frequency of the DW communication at the reduced frequency. In a case where the execution frequency of the DW communication is the reduced frequency, the WLAN unit 816 omits, for example, the DW communication operation in any of the DWs 201. In a case where the execution frequency of the DW communication is the reduced frequency, specifically, for example, the WLAN unit 816 performs the DW communication operation only once in four successive DWs 201. In a case where the execution frequency of the DW communication is the reduced frequency, the WLAN unit 816 may not set the DW 201 and may execute the DW communication at a frequency other than a frequency of once in four times. In a case where the execution frequency of the DW communication is the reduced frequency, the execution frequency of the DW communication only has to be at least lower than that in a case where the execution frequency of the DW communication is the normal frequency. In other words, in a case where the execution frequency of the DW communication is the reduced frequency, the number of execution times of the DW communication in the unit time (e.g., one second) only has to be at least lower than that in a case where the execution frequency of the DW communication is the normal frequency. In a case where the instruction of the NAN operation has been issued with the execution frequency of the DW communication at the reduced frequency, the present processing may be omitted.

In step S406, the CPU 802 reads the setting information about the NAN stored in the RAM 804 and the like and determines whether the NAN function is disabled. In step S406, the CPU 802 may determine whether the WLAN function is disabled. In step 406, the CPU 802 stops the communication using the NAN and terminates the processing in the case of YES in the determination (YES in step S406), and returns the processing to step S402 in the case of NO in the determination (NO in step S406).

As described above, according to the present exemplary embodiment, in a case where the printer 100 is required to operate the NAN and a wireless communication function other than the NAN at the same time, the printer 100 performs the operations with the execution frequency of the DW communication being reduced. Thus, the NAN communication is executed in the DW, and accordingly a frequency of occurrence of a phenomenon can be reduced in which the wireless communication other than the NAN cannot be executed. Further, a frequency of occurrence of a period which is generated between execution of the NAN communication and execution of the wireless communication other than the NAN and in which either communications cannot be executed can be reduced. On the other hand, the DW communication is executed at the normal frequency in a state in which the wireless communication function other than the NAN does not operate, and only the NAN communication is executed, so that responsiveness to a search for the service can be suppressed from being reduced.

According to the above-described exemplary embodiments, the execution frequency of the DW communication is reduced in response to communication and connection being executed using the normal Wi-Fi®. However, the execution frequency of the DW communication may be reduced in response to communication and connection being executed using a communication standard other than the normal Wi-Fi®. Specifically, for example, the execution frequency of the DW communication may be reduced in response to communication and connection being executed using the communication standard using a frequency band same as that of the NAN. Bluetooth® includes, for example, Classic Bluetooth® and Bluetooth® Low Energy. This is because in a case where the frequency band same as that in the NAN is used in communication other than that using the NAN, the communication other than that using the NAN interferes with the communication using the NAN. Thus, the printer 100 may reduce the execution frequency of the DW communication in a case where communication and connection are executed using the communication standard other than the normal Wi-Fi®, and the communication and connection using the relevant communication standard use a communication channel same as that of the NAN. Further, for example, the printer 100 may reduce the execution frequency of the DW communication during communication using the NAN data link. In other words, the printer 100 may execute communication using the NAN data link in preference to the DW communication in the communication using the NAN.

According to the first exemplary embodiment, the execution frequency of the DW communication is reduced in a state in which the wireless communication function other than the NAN is operated (wireless connection is performed through a wireless communication method other than the NAN). According to a second exemplary embodiment, a configuration is described in which the execution frequency of the DW communication is reduced in a state in which communication is actually executed through the wireless communication method other than the NAN.

A communication system and a configuration of each apparatus according to the present exemplary embodiment are similar to those according to the first exemplary embodiment.

According to the present exemplary embodiment, a print job and a scan job are received from another apparatus via the infrastructure connection and the P2P connection using the wireless communication function other than the NAN (the normal Wi-Fi®).

Figure 5:
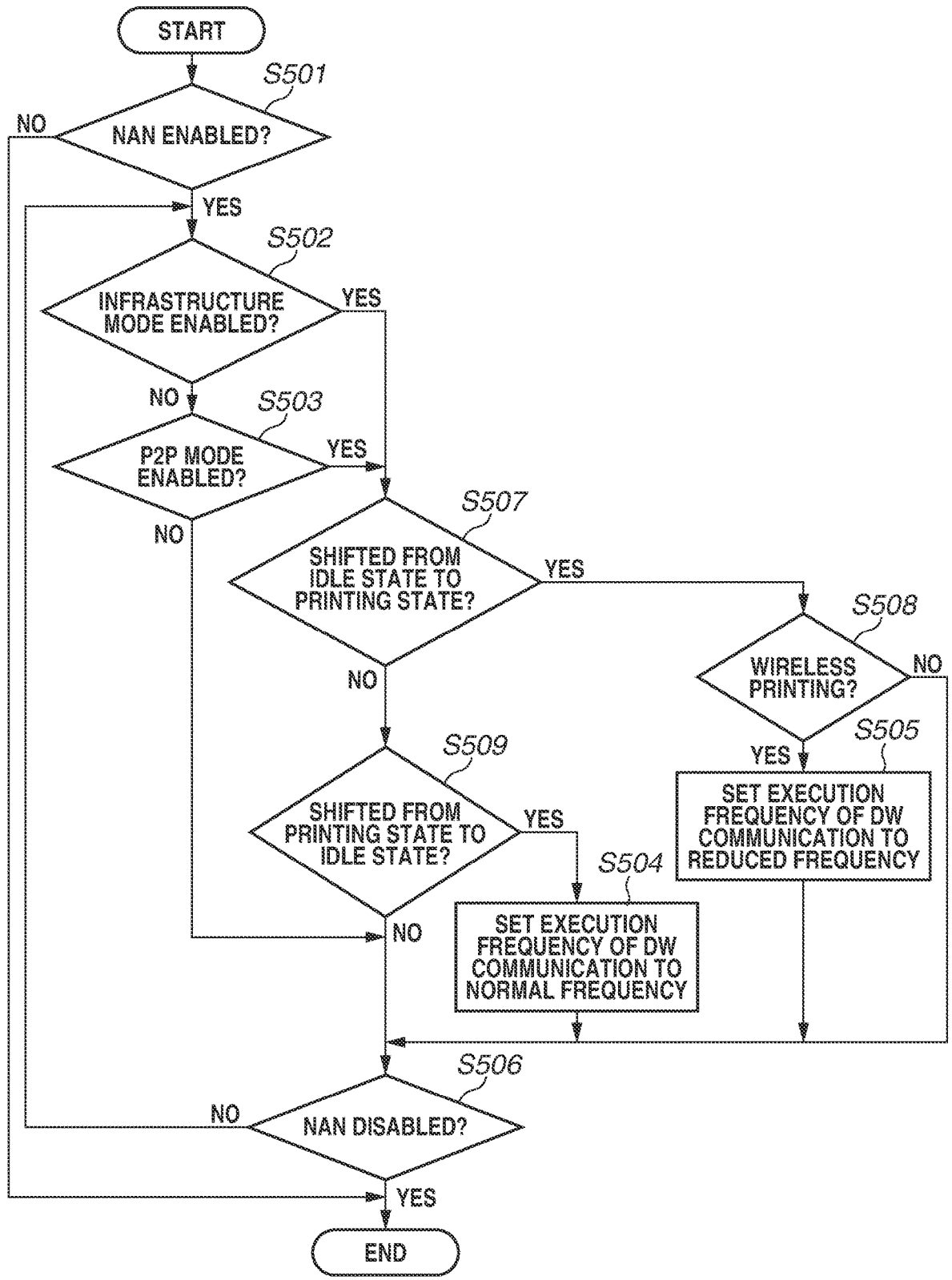
FIG. 5 is a flowchart illustrating setting processing of an execution frequency of DW communication executed by a printer according to a second exemplary embodiment.

FIG. 5 is a flowchart illustrating setting processing of the execution frequency of the DW communication executed by the printer 100. The processing in the present flowchart is realized, for example, by the CPU 802 reading a program stored in the memory such as the ROM 803 to the RAM 804 and executing the program. Further, the processing in the present flowchart is started in response to, for example, enabling of the WLAN function in the printer 100.

Processing in steps S501 to S506 is similar to the processing in steps S401 to S406, and thus the description thereof is omitted.

In step S507, the CPU 802 determines whether a state of the printer 100 is shifted from an IDLE state to a printing state. The IDLE state is a state in which the printer 100 does not execute reception of a print job from the terminal device 101 and printing processing based on a print job. On the other hand, the printing state is a state in which the printer 100 executes reception of a print job from the terminal device 101 and the printing processing based on the print job. In step S507, the CPU 802 advances the processing to step S508 in the case of YES in the determination and advances the processing to step S509 in the case of NO in the determination.

In step S508, the CPU 802 determines whether the printing processing in the printing state is wireless printing processing. The wireless printing processing includes processing for receiving a print job using the wireless communication function other than the NAN (the normal Wi-Fi® function and the like) and processing for executing the printing processing based on a print job received using the wireless communication function other than the NAN. The printing processing other than the wireless printing processing includes processing for receiving a print job using a wired communication and processing for executing the printing processing based on a print job received using a wireless communication and image data in a Universal Serial Bus (USB) memory installed in the printer 100. In step S508, the CPU 802 advances the processing to step S505 in the case of YES in the determination and advances the processing to step S506 in the case of NO in the determination.

In step S509, the CPU 802 determines whether the state of the printer 100 is shifted from the printing state to the IDLE state. In step S509, the CPU 802 advances the processing to step S504 in the case of YES in the determination and advances the processing to step S506 in the case of NO in the determination.

As described above, according to the present exemplary embodiment, the printer 100 operates with the execution frequency of the DW communication being reduced in a case where the wireless printing processing is executed. Thus, the NAN communication is executed in the DW, and accordingly a frequency of occurrence of a phenomenon can be reduced in which the wireless communication other than the NAN cannot be executed. Further, a frequency of occurrence of a period which is generated between execution of the NAN communication and execution of the wireless communication other than the NAN and in which either communications cannot be executed can be reduced. On the other hand, the DW communication is executed at the normal frequency in a state in which the wireless printing processing is not executed, so that responsiveness to a search for the service can be suppressed from being reduced.

According to the present exemplary embodiment, the printing state includes a state in which a print job is not received, and printing based on a print job is executed. In addition, the execution frequency of the DW communication is reduced in the state in which a print job is not received, and printing based on a print job is executed. This is because communication of a printing status based on a print job and error information is performed using the normal Wi-Fi® in the state in which printing based on a print job is executed. The printing state may not include the state in which a print job is not received, and printing based on a print job is executed. In other words, a configuration may be adopted which returns the execution frequency of the DW communication to the normal frequency in the state in which a print job is not received, and printing based on a print job is executed.

According to the present exemplary embodiment, the printer 100 reduces the execution frequency of the DW communication in a case where the wireless printing processing is executed. However, the printer 100 may reduce the execution frequency of the DW communication in a case where wireless scan processing and wireless setting processing are executed without being limited to the above-described configuration. The wireless scan processing is processing for receiving a scan job using the wireless communication function other than the NAN and executing scan processing based on the scan job received using the wireless communication function other than the NAN. The wireless setting processing is processing for receiving a setting job using the wireless communication function other than the NAN and executing setting processing based on the setting job received using the wireless communication function other than the NAN. The printer 100 may reduce the execution frequency of the DW communication in a case where communication of data other than a print job, a scan job, and a setting job is performed using the wireless communication function other than the NAN.

According to the present exemplary embodiment, the execution frequency of the DW communication is the normal frequency in a state in which the printer 100 does not connect to another apparatus using the wireless communication function other than the NAN. Further, the execution frequency of the DW communication is also the normal frequency in a state in which the printer 100 connects to the another apparatus using the wireless communication function other than the NAN and does not perform data communication using the wireless communication function other than the NAN. In other words, the execution frequency of the DW communication is the same in each of the above-described states. However, according to the present exemplary embodiment, the printer 100 may further switch the execution frequency of the DW communication depending on whether the printer 100 connects to the another apparatus using the wireless communication function other than the NAN as in the case of the first exemplary embodiment. For example, the execution frequency of the DW communication may be set to the normal frequency in a state in which the printer 100 does not connect to the another apparatus using the wireless communication function other than the NAN. Further, the execution frequency of the DW communication may be set to the reduced frequency in a state in which the printer 100 connects to the another apparatus using the wireless communication function other than the NAN and performs data communication using the wireless communication function other than the NAN. Furthermore, the execution frequency of the DW communication may be set to a specific frequency which is lower than the normal frequency and higher than the reduced frequency in a state in which the printer 100 connects to the another apparatus using the wireless communication function other than the NAN and does not perform data communication.

According to the second exemplary embodiment, the configuration is described in which the execution frequency of the DW communication is reduced in a state in which the wireless printing processing is executed. According to a third exemplary embodiment, a configuration is described in which the execution frequency of the DW communication is returned to an original one in a case where an error occurs in the wireless printing processing being executed.

A communication system and a configuration of each apparatus according to the present exemplary embodiment are similar to those according to the second exemplary embodiment.

According to the present exemplary embodiment, a print job and a scan job are received from another apparatus via the infrastructure connection and the P2P connection using the wireless communication function other than the NAN (the normal Wi-Fi®).

Figure 6:
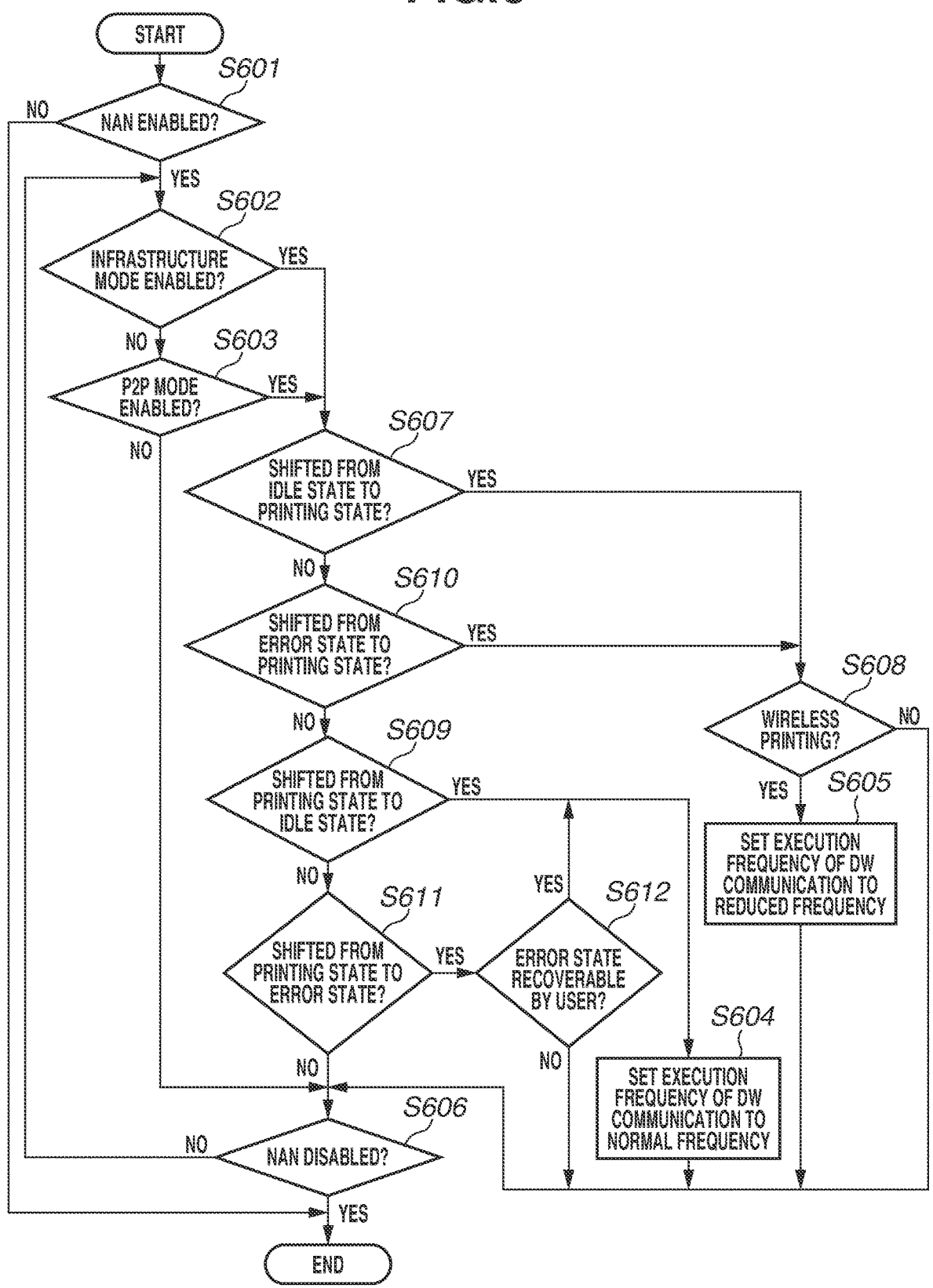
FIG. 6 is a flowchart illustrating setting processing of an execution frequency of DW communication executed by a printer according to a third exemplary embodiment.

FIG. 6 is a flowchart illustrating setting processing of the execution frequency of the DW communication executed by the printer 100. The processing in the present flowchart is realized, for example, by the CPU 802 reading a program stored in the memory such as the ROM 803 to the RAM 804 and executing the program. Further, the processing in the present flowchart is started in response to, for example, enabling of the WLAN function in the printer 100.

Processing in steps S601 to S609 is similar to the processing in steps S501 to S509 according to the second exemplary embodiment, and thus the description thereof is omitted.

In step S610, the CPU 802 determines whether the state of the printer 100 is shifted from an error state to the printing state. The error state includes a state in which an error which can be easily recovered by a user occurs in the printer 100 and a state in which an error which is difficult for a user to recover occurs in the printer 100. The error which can be easily recovered by a user includes, for example, a paper empty error in which paper used for printing has run out, an ink error in which ink used for printing has run out, and a paper jam error in which paper used for printing is jammed in a conveyance path. The error which is difficult for a user to recover includes an error in which an abnormality occurs in hardware, such as an electrical circuit and a mechanical mechanism, in the printer 100. In step S610, the CPU 802 advances the processing to step S608 in the case of YES in the determination and advances the processing to step S609 in the case of NO in the determination.

In step S611, the CPU 802 determines whether the state of the printer 100 is shifted from the printing state to the error state. In step S611, the CPU 802 advances the processing to step S612 in the case of YES in the determination and advances the processing to step S606 in the case of NO in the determination.

In step S612, the CPU 802 determines whether the state of the printer 100 is the error state in which the error which can be easily recovered by a user occurs in the printer 100. In step S612, the CPU 802 advances the processing to step S604 in the case of YES in the determination and advances the processing to step S606 in the case of NO in the determination.

As described above, according to the present exemplary embodiment, in a case where the state of the printer 100 is shifted to the error state, the execution frequency of the DW communication is returned to the normal frequency. This is because, the execution frequency of the DW communication is returned to the normal frequency, and it becomes easier for an external apparatus around the printer 100 to find the printer 100. Further, it becomes easier to notify a user who has the external apparatus around the printer 100 of the occurrence of an error in the printer 100.

According to the present exemplary embodiment, in a case where the state of the printer 100 is shifted to the error state in which the error which can be easily recovered by a user occurs in the printer 100, the execution frequency of the DW communication is returned to the normal frequency. In addition, in a case where the state of the printer 100 is shifted to the error state in which the error which is difficult for a user to recover occurs in the printer 100, the execution frequency of the DW communication is not returned to the normal frequency. This is because occurrence of the error which is difficult for a user to recover in the printer 100 is not necessary to be notified to a user. The present exemplary embodiment may adopt a configuration in which the execution frequency of the DW communication is returned to the normal frequency even in a case where the state of the printer 100 is shifted to the error state in which the error which is difficult for a user to recover occurs in the printer 100 without being limited to the above-described configuration. In addition, a content of a signal transmitted in the DW communication may be changed in a case where the printer 100 is in the error state. In other words, for example, in a case where the printer 100 is in the error state, a publish message may include a content notifying that the printer 100 is in the error state.

According to the present exemplary embodiment, in a case where the state of the printer is shifted to the error state, a set frequency is returned to the normal frequency. However, the present exemplary embodiment may set the set frequency to a predetermined frequency different from the normal frequency and operate the NAN without being limited to the above-described configuration. In a case where the execution frequency of the DW communication is in the predetermined frequency, the execution frequency of the DW communication has only to be at least higher than that in a case where the execution frequency of the DW communication is the reduced frequency. In other words, in a case where the execution frequency of the DW communication is the predetermined frequency, the number of execution times of the DW communication in a unit time one second) has only to be at least higher than that in a case where the execution frequency of the DW communication is the reduced frequency According to the present exemplary embodiment, the configuration is described in which the execution frequency of the DW communication is set according to the error state of the printer 100 in a state in which the printer 100 connects to another apparatus using the communication method other than the NAN (a state of YES in step S602 or YES in step S603). However, the present exemplary embodiment is not limited to this configuration. For example, the execution frequency of the DW communication may be set according to the error state of the printer 100 in a state in which the printer 100 does not connect to the another apparatus using the communication method other than the NAN (a state of NO in step S602 and NO in step S603). For example, even in a state in which the printer 100 does not connect to the another apparatus using the communication method other than the NAN, the execution frequency of the DW communication may be set to a frequency higher than the normal frequency if the printer 100 is in the error state. Particularly, in the case of the error state in which the error which can be easily recovered by a user occurs in the printer 100, the execution frequency of the DW communication may be set to a frequency higher than the normal frequency.

Other Embodiments

According to the above-described exemplary embodiments, the configuration is described in which the execution frequency of the DW communication is adjusted according to an operation status of the wireless communication other than the NAN. However, the execution frequency of the DW communication may be adjusted according to an element other than the operation status of the wireless communication other than the NAN. For example, the printer 100 can switch a power state of itself from a power-off state to a power-on state in which power consumption is greater than that in the power-off state through power-on processing. Thus, the printer 100 may adjust the execution frequency of the DW communication according to an elapsed time from the power-on of the printer 100 (an elapsed time from the switching of the power state of the printer 100). Specifically, the printer 100 may perform control to increase the execution frequency of the DW communication immediately after the power-on (or until a specific time elapses from the power-on) in which the service notification and transmission of a message are highly important in the DW. In this regard, for example, an increase degree of the execution frequency of the DW communication may be reduced according to an elapsed time from the power-on. Further, for example, the execution frequency of the DW communication may be adjusted according to an elapsed time from when the NAN function of the printer 100 is operated. Specifically, the printer 100 may increase the execution frequency of the DW communication immediately after the NAN function is operated (or until a predetermined time elapses from when the NAN function is operated) in which the service notification and transmission of a message are highly important in the DW. In this regard, for example, an increase degree of the execution frequency of the DW communication may be reduced according to an elapsed time from when the NAN function is operated.

Further, according to the above-described exemplary embodiments, not only the set frequency of the DW but also a master preference value which represents a tendency to be a Master in the NAN cluster 110 may be changed according to the operation status of the wireless communication other than the NAN. In the NAN cluster 110, an apparatus having a higher master preference value will be a Master. The printer 100 changes the master preference value (sets a value not to be the Master, or sets a small value hardly to be the Master), and thus the printer 100 hardly becomes the Master in the NAN cluster 110. The Master has to issue the sync beacon 203 in all of settable DWs. Under a situation in which it is desirable to reduce the execution frequency of the DW communication, the master preference value is set smaller, and occurrence of a situation can be suppressed in which the printer 100 becomes the Master and cannot execute processing for reducing the execution frequency of the DW communication.

The printer 100 may be able to maintain the infrastructure connection and the P2P connection using the normal Wi-Fi® concurrently (in parallel). To establish the infrastructure connection and the P2P connection concurrently (in parallel) and to operate in a communicable manner concurrently (in parallel) via the infrastructure connection and the P2P connection is referred to as a simultaneous operation. Further, the printer 100 may perform control not to execute the simultaneous operation in a state in which the NAN is operated. This is because the communication using the NAN, the communication using the infrastructure connection, and the communication using the P2P connection each are executed using a single wireless integrated circuit (IC) chip. However, in a case where these three networks are controlled by the single wireless IC chip concurrently (in parallel), the network control becomes complicated. Further, for example, in a case where an instruction to start an operation using the NAN is issued in a state in which the simultaneous operation is executed, the printer 100 may start the operation using the NAN after terminating either of the infrastructure connection and the P2P connection. In this regard, the printer 100 may prioritize termination of the P2P connection. Further, for example, in a case where execution of the simultaneous operation is permitted in a state in which the NAN is operated, the printer 100 may execute control described below. The printer 100 may perform control to lower the execution frequency of the DW communication in a state in which the simultaneous operation is executed, and the NAN is operated than the execution frequency of the DW communication in a state in which either of the infrastructure connection and the P2P connection is established, and the NAN is operated.

In a case where the printer 100 establishes the P2P connection by serving itself as an access point, the printer 100 determines a communication channel used for the P2P connection. In a case where the printer 100 newly establishes the P2P connection by the normal Wi-Fi® in a state in which the communication by the NAN is enabled, the printer 100 may determine a communication channel being used for the communication by the NAN as a communication channel used for the P2P connection by the normal Wi-Fi®. Further, the printer 100 can determine by itself a communication channel used for the communication using the NAN. Thus, in a case where the communication using the NAN is started in a state in which the P2P connection using the normal Wi-Fi® is established, the printer 100 may determine the communication channel being used for the P2P connection using the normal Wi-Fi® as the communication channel used for the communication using the NAN. Similarly, in a case where the communication using the NAN is started in a state in which the infrastructure connection using the normal Wi-Fi® is established, the printer 100 may determine the communication channel being used for the infrastructure connection using the normal Wi-Fi® as the communication channel used for the communication using the NAN. Accordingly, in a case where the communication using the NAN and the communication using the normal Wi-Fi® are switched, it is not necessary to switch the communication channel to be used. In other words, occurrence of a time period which is generated due to switching of the communication channel to be used and in which communication cannot be performed can be suppressed.

According to the above-described exemplary embodiments, the configurations for adjusting the execution frequency of the DW communication are described. However, the above-described exemplary embodiments are not limited to these configurations. For example, a length of a DW may be shortened instead of reducing the execution frequency of the DW communication. This control can reduce the number of execution times of the DW communication executed in a unit time. Further, for example, the control to reduce the execution frequency of the DW communication and the control to shorten the length of the DW may be performed in parallel.

According to the above-described exemplary embodiments, processing for achieving an object of appropriate control of a communication frequency in the NAN executed in the DW is described. However, the above-described exemplary embodiments may be applied to another object. In other words, the above-described exemplary embodiments may be applied to appropriately control a communication frequency in a predetermined communication method executed in a period which has a predetermined time length and comes at a predetermined time interval.

According to the present embodiment, a communication frequency in the NAN executed in a DW can be appropriately controlled.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2018-014190, which was filed on Jan. 30, 2018 and which is hereby incorporated by reference herein in its entirety.

What is claimed is:

1. A communication apparatus which executes communication using a Neighbor Awareness Network and communication using a communication method other than the Neighbor Awareness Network, the communication apparatus comprising:
at least one processor,
wherein the at least one processor is configured to function as:
a communication unit configured to execute communication of a predetermined signal based on the Neighbor Awareness Network with another communication apparatus in a discovery window which is a period in which the predetermined signal is communicated and which comes at a predetermined time interval; and
a control unit configured to control the communication unit so that a number of times communication of the predetermined signal is executed per unit time in a state in which a connection using the communication method other than the Neighbor Awareness Network is established is smaller than a number of times communication of the predetermined signal is executed per unit time in a state in which the connection using the communication method other than the Neighbor Awareness Network is not established.

2. The communication apparatus according to claim 1, wherein, in the state in which the connection using the communication method other than the Neighbor Awareness Network is not established, communication of the predetermined signal is executed in all of a plurality of the discovery windows.

3. The communication apparatus according to claim 1, wherein, in the state in which the connection using the communication method other than the Neighbor Awareness Network is established, communication of the predetermined signal is omitted in any of all the discovery windows.

4. The communication apparatus according to claim 1, wherein the communication unit is controlled so that the number of times the communication of the predetermined signal is executed per unit time in a state in which the connection using the communication method other than the Neighbor Awareness Network is established, and data communication is executed using the communication method other than the Neighbor Awareness Network is smaller than the number of times the communication of the predetermined signal is executed per unit time in a state in which the connection using the communication method other than the Neighbor Awareness Network is established, and data communication is not executed using the communication method other than the Neighbor Awareness Network.

5. The communication apparatus according to claim 1, wherein the communication unit is controlled so that the number of times the communication of the predetermined signal is executed per unit time in the state in which the connection using the communication method other than the Neighbor Awareness Network is not established is the same as the number of times the communication of the predetermined signal is executed per unit time in a state in which the connection using the communication method other than the Neighbor Awareness Network is established, and data communication is not executed using the communication method other than the Neighbor Awareness Network.

6. The communication apparatus according to claim 1, wherein the communication unit is controlled so that the number of times the communication of the predetermined signal is executed per unit time in a state in which the connection using the communication method other than the Neighbor Awareness Network is established, and processing based on data received using the communication method other than the Neighbor Awareness Network is executed is smaller than the number of times the communication of the predetermined signal is executed per unit time in a state in which the connection using the communication method other than the Neighbor Awareness Network is established, and processing based on data received using the communication method other than the Neighbor Awareness Network is not executed.

7. The communication apparatus according to claim 1, wherein the communication unit is controlled so that the number of times the communication of the predetermined signal is executed per unit time in the state in which the connection using the communication method other than the Neighbor Awareness Network is not established is the same as the number of times the communication of the predetermined signal is executed per unit time in a state in which the connection using the communication method other than the Neighbor Awareness Network is established, and processing based on data received using the communication method other than the Neighbor Awareness Network is not executed.

8. The communication apparatus according to claim 1, wherein the communication unit is controlled so that the number of times the communication of the predetermined signal is executed per unit time in a state in which an error does not occur in processing based on data received using the communication method other than the Neighbor Awareness Network is smaller than the number of times the communication of the predetermined signal is executed per unit time in a state in which an error occurs in processing based on data received using the communication method other than the Neighbor Awareness Network.

9. The communication apparatus according to claim 1, wherein the communication unit is controlled so that the number of times the communication of the predetermined signal is executed per unit time in a state in which a predetermined error occurs in processing based on data received using the communication method other than the Neighbor Awareness Network is smaller than the number of times the communication of the predetermined signal is executed per unit time in a state in which an error other than the predetermined error occurs in processing based on data received using the communication method other than the Neighbor Awareness Network.

10. The communication apparatus according to claim 6, wherein the processing based on data received using the communication method other than the Neighbor Awareness Network is at least one of printing processing executed based on a print job, scan processing executed based on a scan job, and setting processing executed based on a setting job.

11. The communication apparatus according to claim 1, wherein the at least one processor is configured to further function as: a transmission unit configured to transmit setting information for establishing a connection using the communication method other than the Neighbor Awareness Network using the Neighbor Awareness Network, and
wherein data communication is executed using the communication method other than the Neighbor Awareness Network via a connection established based on the setting information.

12. The communication apparatus according to claim 1, wherein the communication unit is controlled so that the number of times the communication of the predetermined signal is executed per unit time in a state in which the connection using the communication method other than the Neighbor Awareness Network is established using the communication apparatus operating as a slave station in a network to which the communication apparatus belongs and the number of times the communication of the predetermined signal is executed per unit time in a state in which the connection using the communication method other than the Neighbor Awareness Network is established using the communication apparatus operating as a master station in the network to which the communication apparatus belongs are smaller than the number of times the communication of the predetermined signal is executed per unit time in the state in which the connection using the communication method other than the Neighbor Awareness Network is not established.

13. The communication apparatus according to claim 1, wherein the communication method other than the Neighbor Awareness Network is Wi-Fi® or Bluetooth®.

14. The communication apparatus according to claim 1, wherein the predetermined signal is a signal representing a service provided by the communication apparatus, and
wherein the communication of the predetermined signal includes transmission of the signal representing the service provided by the communication apparatus.

15. The communication apparatus according to claim 1, wherein the predetermined signal is a signal for the another communication apparatus to search a service, and
wherein the communication of the predetermined signal includes reception of the signal for the another communication apparatus to search the service.

16. The communication apparatus according to claim 1, wherein the at least one processor is configured to further function as:

a communication control unit configured to perform control to lower a master preference value of the communication apparatus in the state in which the connection using the communication method other than the Neighbor Awareness Network is established than a master preference value of the communication apparatus in the state in which a connection using the communication method other than the Neighbor Awareness Network is not established.

17. The communication apparatus according to claim 1, wherein the at least one processor is configured to further function as:
an execution unit configured to execute at least one of printing processing executed based on a print job and scan processing executed based on a scan job.

18. The communication apparatus according to claim 1, wherein the communication using the Neighbor Awareness Network and the communication using the communication method other than the Neighbor Awareness Network are executed by a same wireless integrated circuit (IC) chip.

19. A method for controlling a communication apparatus which executes communication using a Neighbor Awareness Network and communication using a communication method other than the Neighbor Awareness Network, the method comprising:
executing predetermined communication using the Neighbor Awareness Network with another communication apparatus in a discovery window which is a period which is defined based on the Neighbor Awareness Network, has a predetermined length, and comes at a predetermined time interval; and
controlling communication using the Neighbor Awareness Network so that a number of times communication of a predetermined signal is executed per unit time in a state in which a connection using the communication method other than the Neighbor Awareness Network is established is smaller than the number of times the communication of the predetermined signal is executed per unit time in a state in which the connection using the communication method other than the Neighbor Awareness Network is not established.

20. A storage medium storing a program for causing a computer in a communication apparatus which executes communication using a Neighbor Awareness Network and communication using a communication method other than the Neighbor Awareness Network to execute:
predetermined communication using the Neighbor Awareness Network with another communication apparatus in a discovery window which is a period which is defined based on the Neighbor Awareness Network, has a predetermined length, and comes at a predetermined time interval; and
controlling communication using the Neighbor Awareness Network so that a number of times communication of a predetermined signal is executed per unit time in a state in which a connection using the communication method other than the Neighbor Awareness Network is established is smaller than the number of times the communication of the predetermined signal is executed per unit time in a state in which the connection using the communication method other than the Neighbor Awareness Network is not established.

* * * * *